(12) United States Patent
Nilsson et al.

(10) Patent No.: US 6,336,273 B1
(45) Date of Patent: Jan. 8, 2002

(54) DEVICE TO HOLD AND GUIDE AN ANNULAR SHAPED SAW BLADE

(75) Inventors: Dan Nilsson, Sjuntorp; Ove Donnerdal, Sävedalen; Håkan Larsson, Mölndal, all of (SE)

(73) Assignee: Aktiebolaget Electrolux (publ) (SE)

( * ) Notice: Subject to any disclaimer, the term of this patent is extended or adjusted under 35 U.S.C. 154(b) by 0 days.

(21) Appl. No.: 09/094,610

(22) Filed: Jun. 15, 1998

(30) Foreign Application Priority Data

Jun. 25, 1997 (SE) .............................................. 9702436

(51) Int. Cl.[7] .................................................. B27B 5/14
(52) U.S. Cl. .......................................... 30/389; 30/276
(58) Field of Search ................................ 30/123.3, 125, 30/389, 276; 451/358; 125/13.01

(56) References Cited

U.S. PATENT DOCUMENTS

| | | | |
|---|---|---|---|
| 3,221,783 A | * 12/1965 | Kaltenmark et al. | 30/376 |
| 3,438,410 A | * 4/1969 | Santilli | 30/389 |
| 3,930,310 A | * 1/1976 | Santilli | 30/389 |
| 4,316,328 A | * 2/1982 | Duggan et al. | 30/389 |
| 4,352,241 A | * 10/1982 | Johansson | 30/389 |
| 4,472,880 A | * 9/1984 | Johansson | 30/389 |
| 4,688,952 A | * 8/1987 | Setele | 384/537 |
| 4,793,065 A | * 12/1988 | Johansson | 30/389 |
| 4,800,650 A | * 1/1989 | Johansson | 30/389 |
| 5,009,011 A | * 4/1991 | Johansson | 30/389 |
| 5,038,474 A | 8/1991 | Larsson et al. | 30/123.3 |
| 5,381,723 A | 1/1995 | Nilsson et al. | 91/437 |
| D406,510 S | * 3/1999 | Nilsson et al. | D8/66 |

\* cited by examiner

Primary Examiner—Rinaldi I. Rada
Assistant Examiner—Thomas J Deuer, Jr.
(74) Attorney, Agent, or Firm—Micheal D. Bednarek; Shaw Pittman LLP

(57) ABSTRACT

A device in connection with a cutting machine with an annular saw blade and with a driving mechanism for off-center drive of the blade. The device includes two first rollers arranged to contact and roll against the web of the saw blade on one side of the blade and two second rollers arranged to contact and roll against the web of the blade on the other, opposite side of the blade. The first rollers are mounted on a first shaft, which is movable along a path against the plane of the saw blade, perpendicularly to the centerline of the shaft, for pressing the first rollers with a certain desired force against the blade web under counter force by the second rollers on the opposite side of the blade.

4 Claims, 9 Drawing Sheets

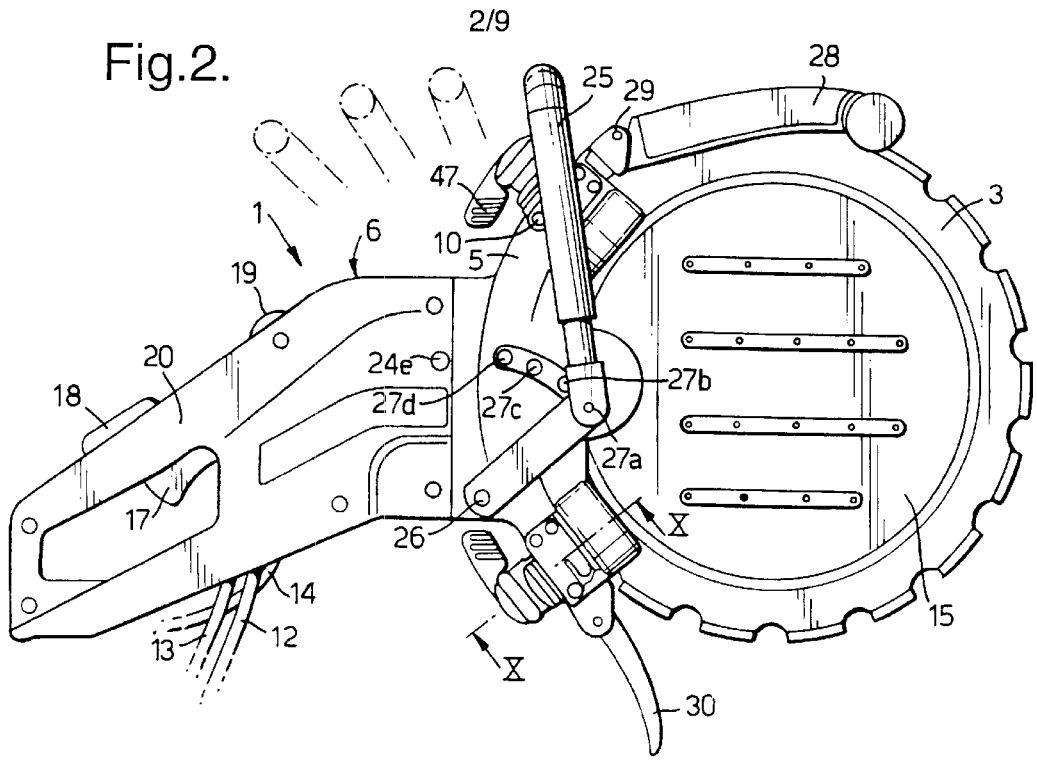
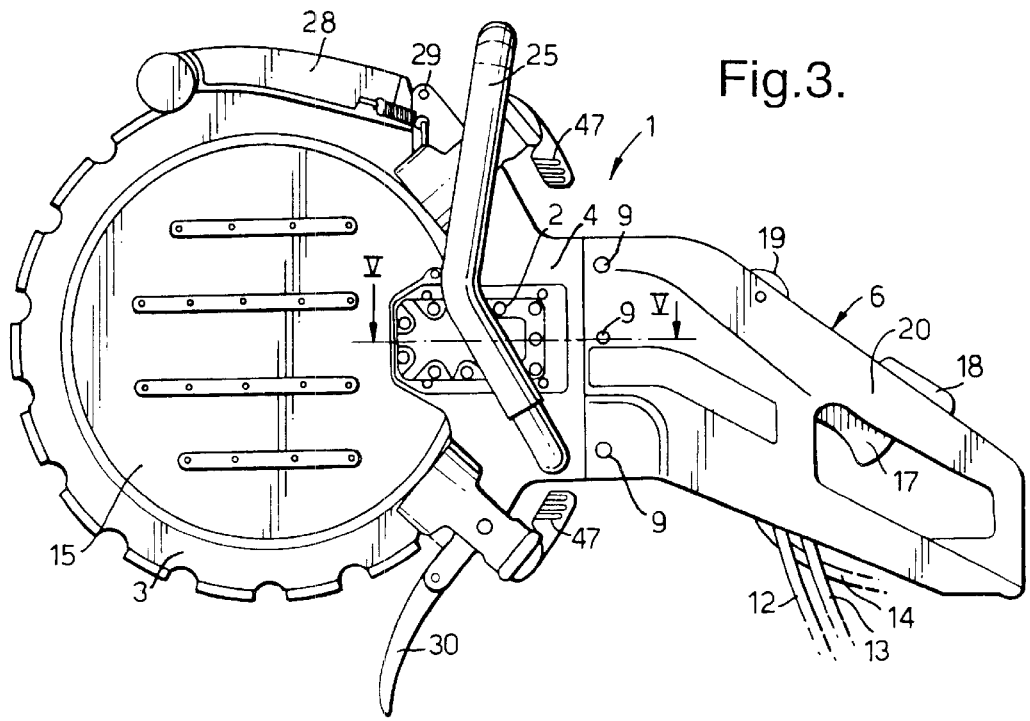

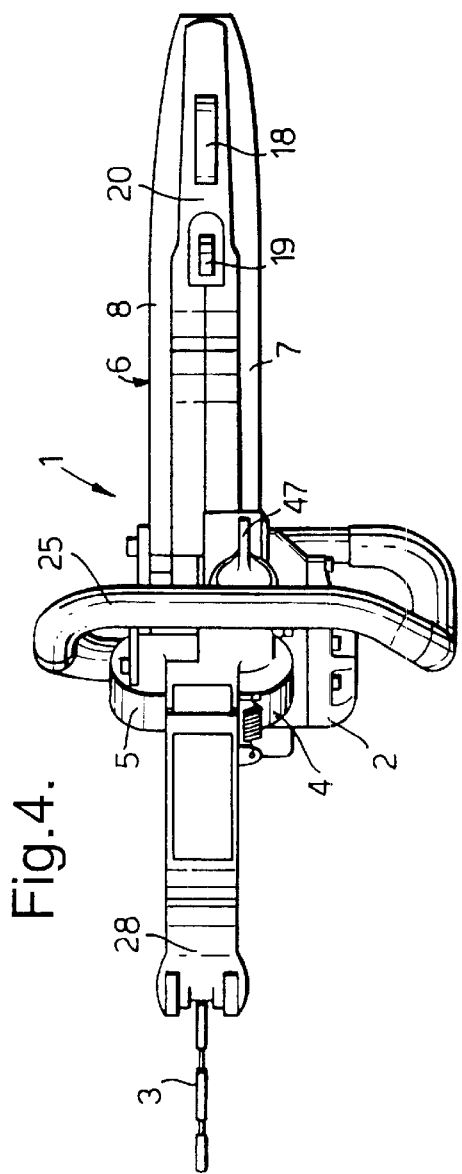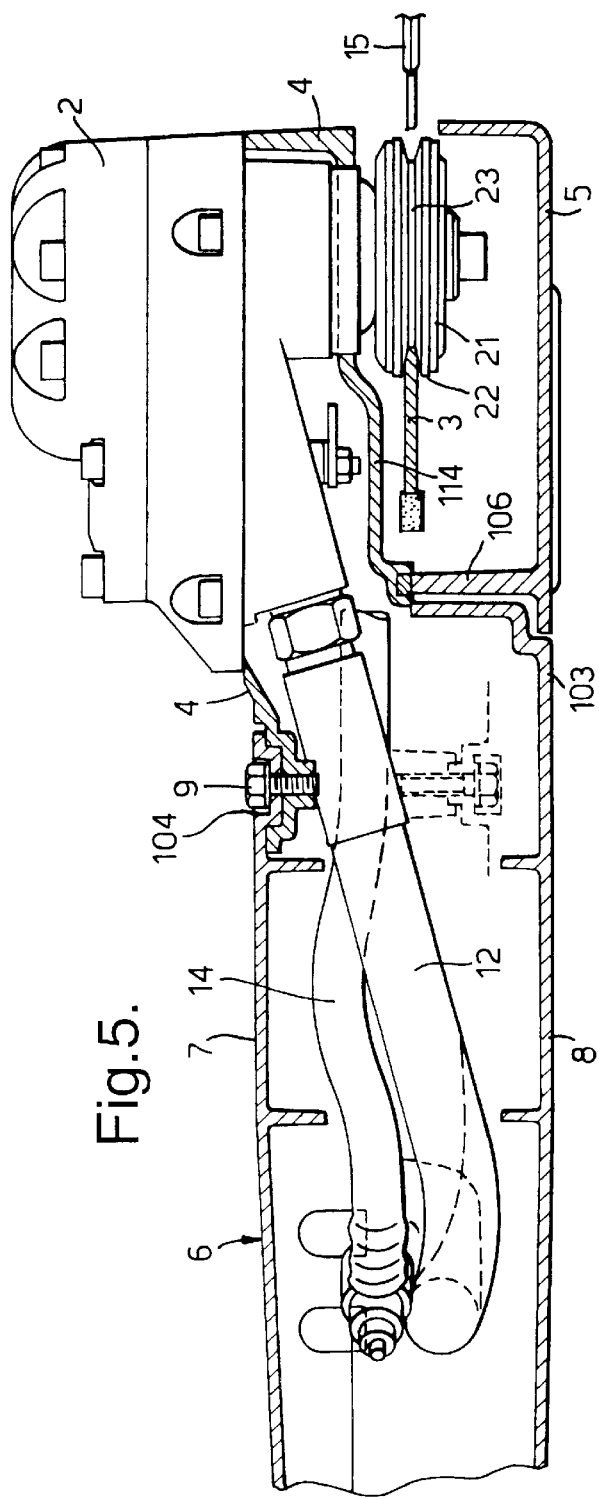

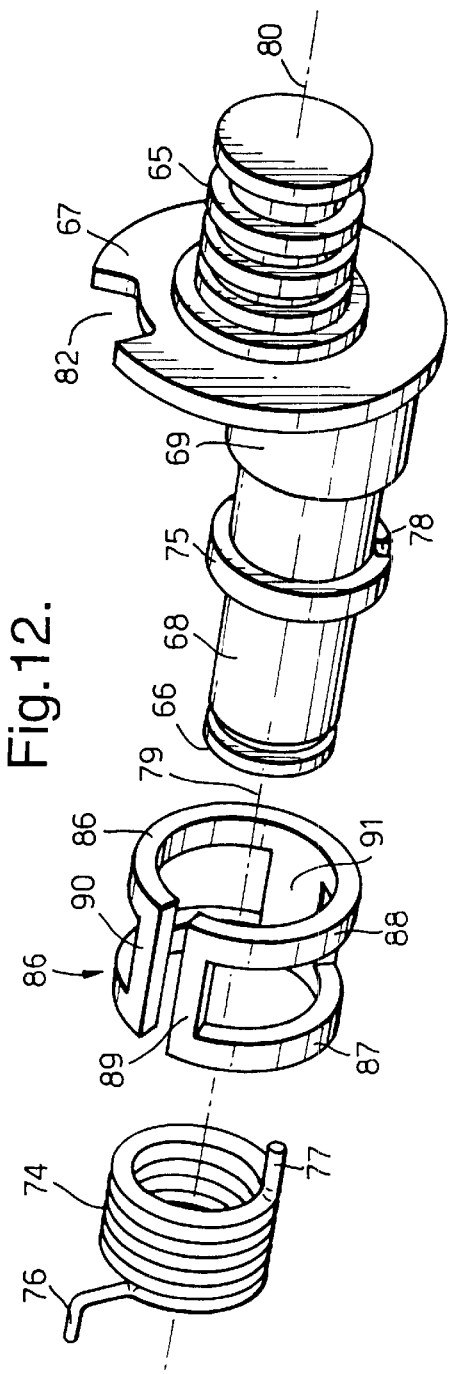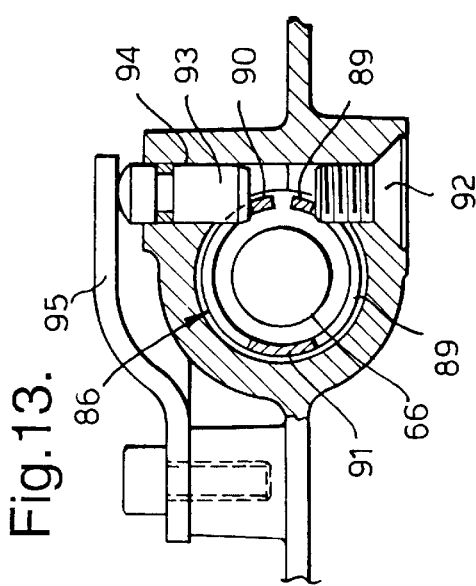

DEVICE TO HOLD AND GUIDE AN ANNULAR SHAPED SAW BLADE

TECHNICAL FIELD

The invention concerns to a device relating to a cutting machine with an annular saw blade and with driving means for off-centre drive of the blade, comprising elements to clamp the blade in the cutting machine, which clamping means comprise two first rollers arranged to contact and to roll against the web of the saw blade on one side of the blade and two second rollers arranged to contact and to roll against the web of the blade on the other, opposite side of the blade. In the concept of cutting machines and saw blades, also saws and cutter wheels are included.

BACKGROUND OF THE INVENTION

A device relating to a cutting machine according to the above is known through U.S. Pat. No. 4,472,880. As is shown in said US Patent there is a guiding groove in the web of the blade. A drive wheel for driving the blade is provided on the inside of the blade, the inner edge being bevelled in a wedge-shaped manner and pressed into a wedge-shaped groove with matching shape in the drive wheel. The above mentioned first or second rollers are, to accomplish this pressing-in, equipped with a flange which is engaged in the guiding groove and which is pressed against the inner edge of the guiding groove. Devices of the kind shown in U.S. Pat. No. 4,793,065 can be used in order to accomplish the necessary force acting on the guide rollers towards the centre of the blade.

The blade is conventionally clamped, in a direction which is parallel with the plane of the saw blade, i.e. in a radial direction, between on one hand the drive wheel which acts against the inner edge of the blade, and on the other hand the guide flanges on the first and second rollers which are equipped with such flanges and which in the following will be denoted guide rollers, said guide flanges acting in the guiding groove. The drive wheel and its wedge-shaped groove also has a clamping effect in the axial direction of the blade, that is across the plane of the blade. Said first and second rollers also cooperate in this axial clamping, which rollers act against the blade web and in a direction towards each other. It is important that the force of the rollers upon the blade web is sufficient in order to create enough friction to make the rollers roll and it is especially important that the guide roller is rotated by the blade. The pressing force must on the other hand not be too large. Tensions in the blade may occur in this case, which may lead to cracking and wreckage of the blade. The skilled man says that the blade is "rolled". It has not been investigated in detail why an excess contact pressure causes cracking, but it is believed that the generation of heat may play a role. Practical experience show, in any case, that the pressing force is the primary cause and that it is essential that the pressing force is adequate, i.e. not too large and not too small either. This has not been possible to accomplish in a satisfactory manner in prior art.

Another problem which not has been solved in a satisfactory manner according to prior art, is the journalling of and possibility to replace the rollers. This concerns the guide rollers as well as the rollers which act on the opposite side of the saw blade in relation to the guide rollers, in the following denoted support rollers.

BRIEF DESCRIPTION OF THE INVENTION

It is a primary object of the invention to accomplish that the saw blade can be clamped between said first and second rollers with a not too small and not too large, in other words a suitable or optimal, clamping force.

It is also an object of the invention to make it possible to easily demount the rollers and to mount new rollers. It is, particularly, an object of this aspect of the invention that the ability to replace the rollers can be combined with the requirement concerning optimal clamping force, and vice versa.

In order to achieve the first objective, to accomplish a suitable clamping in the axial direction, the said device mentioned in the preamble is provided such that said first rollers are mounted on a first shaft, which is movable along a path against the plane of the saw blade, perpendicularly to the centre line of the shaft, for pressing said first rollers with a certain desired force against the blade web under counter force by the second rollers on the opposite side of the blade.

A preferred embodiment is characterised in that said first rollers are journalled on an eccentric journal, which like a crank journal is movable along a circular arc upon turning of an eccentric shaft, wherein spring means are arranged to turn the eccentric shaft, and fixing means are arranged to lock the eccentric shaft when said eccentric shaft has been turned such that the roller, which is journalled on the eccentric journal, is pressed against the web of the blade by means of the spring force. Also other embodiments, however, are conceivable within the scope of the invention. One can, for example, conceive that the shafts, on which said first rollers are journalled, can be arranged to be turnable in a pivot, whose axis of rotation is parallel with the rotational shaft of the rollers, and that said spring means are provided to accomplish the rotation in the pivot, and that said fixing means are arranged to lock a pivot journal or the like in the pivot, when said spring means has turned the corresponding roller to contact the saw blade.

Further characteristic features and aspects of the invention appear from the claims and the following detailed description of a preferred embodiment.

BRIEF DESCRIPTION OF THE DRAWINGS

In the following detailed description, reference will be made to the accompanying drawings, in which FIG. 2 is a side view from the right, showing a first side of the cutting machine and its annular saw blade, FIG. 3 is a side view from the left, showing the other side of the cutting machine and the saw blade, FIG. 4 shows the cutting machine from above, FIG. 5 is a view along the line V—V in FIG. 3, FIG. 12 is an exploded view of a number of details which form a unit in the device for clamping of the saw blade in axial direction in the machine, FIG. 13 is a view along the line XIII—XIII in FIG. 10.

DETAILED DESCRIPTION OF AN EMBODIMENT

Figure 1:
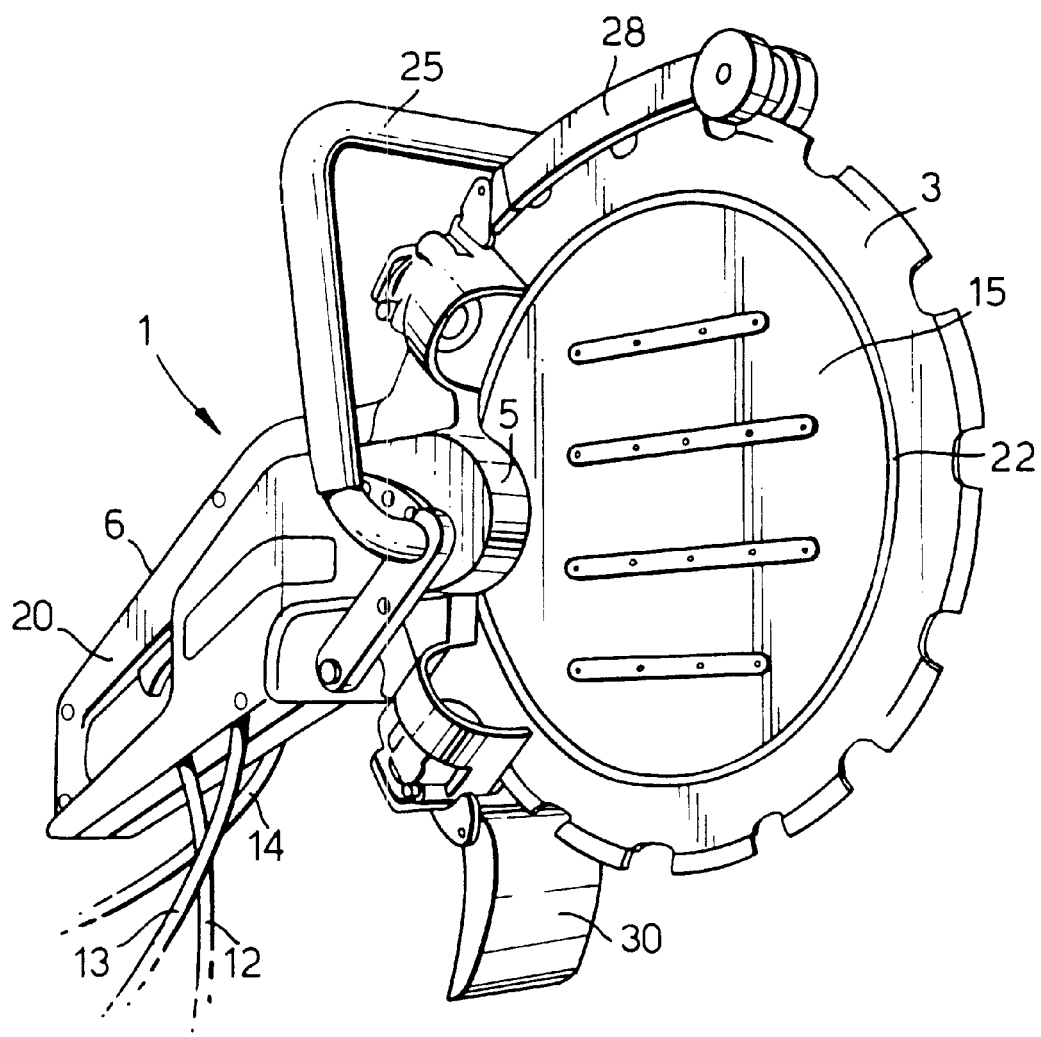
FIG. 1 is a perspective view of a cutting machine, in connection with which the invention can be applied.
Figure 6:
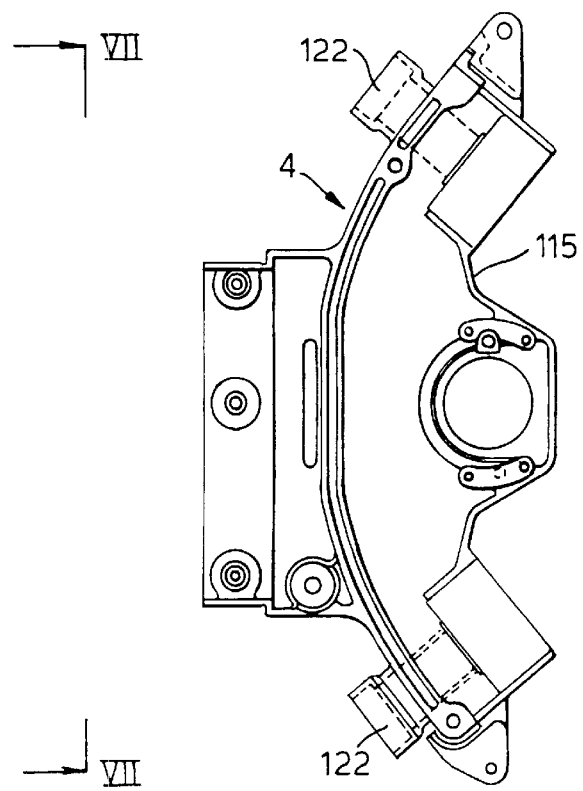
FIG. 6 shows a chassis, which is part of the cutting machine, in a view from the plane of the saw blade.
Figure 7:
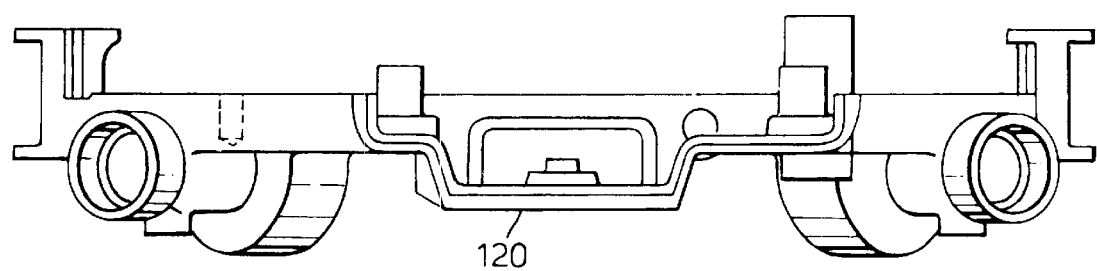
FIG. 7 is a view along the line VII—VII in FIG. 6.
Figure 8:
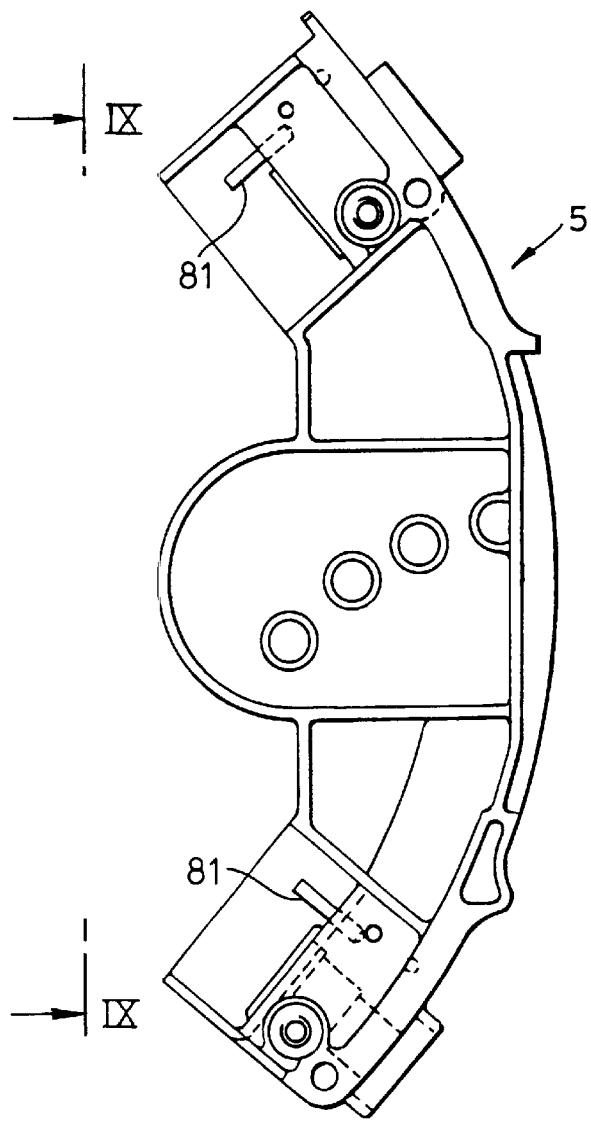
FIG. 8 shows a support roller cover, which is part of the cutting machine, in a view from the plane of the saw blade.
Figure 9:
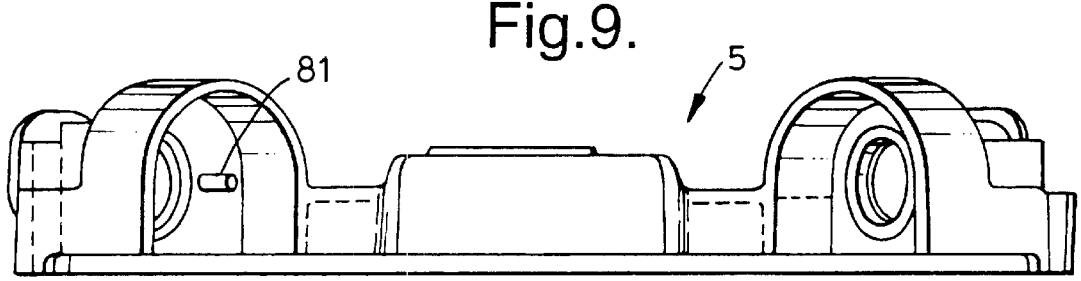
FIG. 9 is a view along the line IX—IX in FIG. 8.
Figure 10:
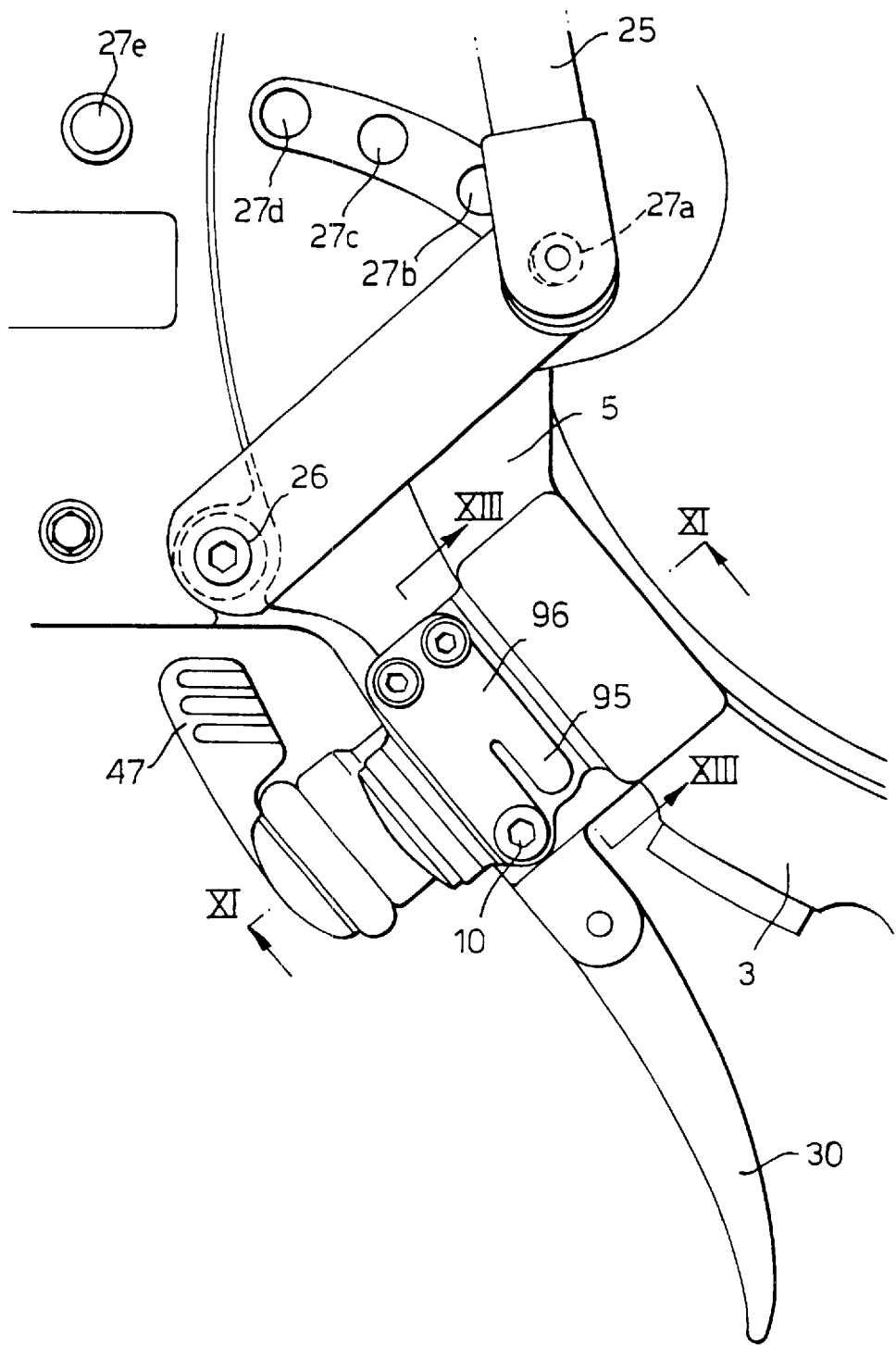
FIG. 10 shows, in an enlarged scale, a detail in FIG. 2, including the device according to the invention.
Figure 11:
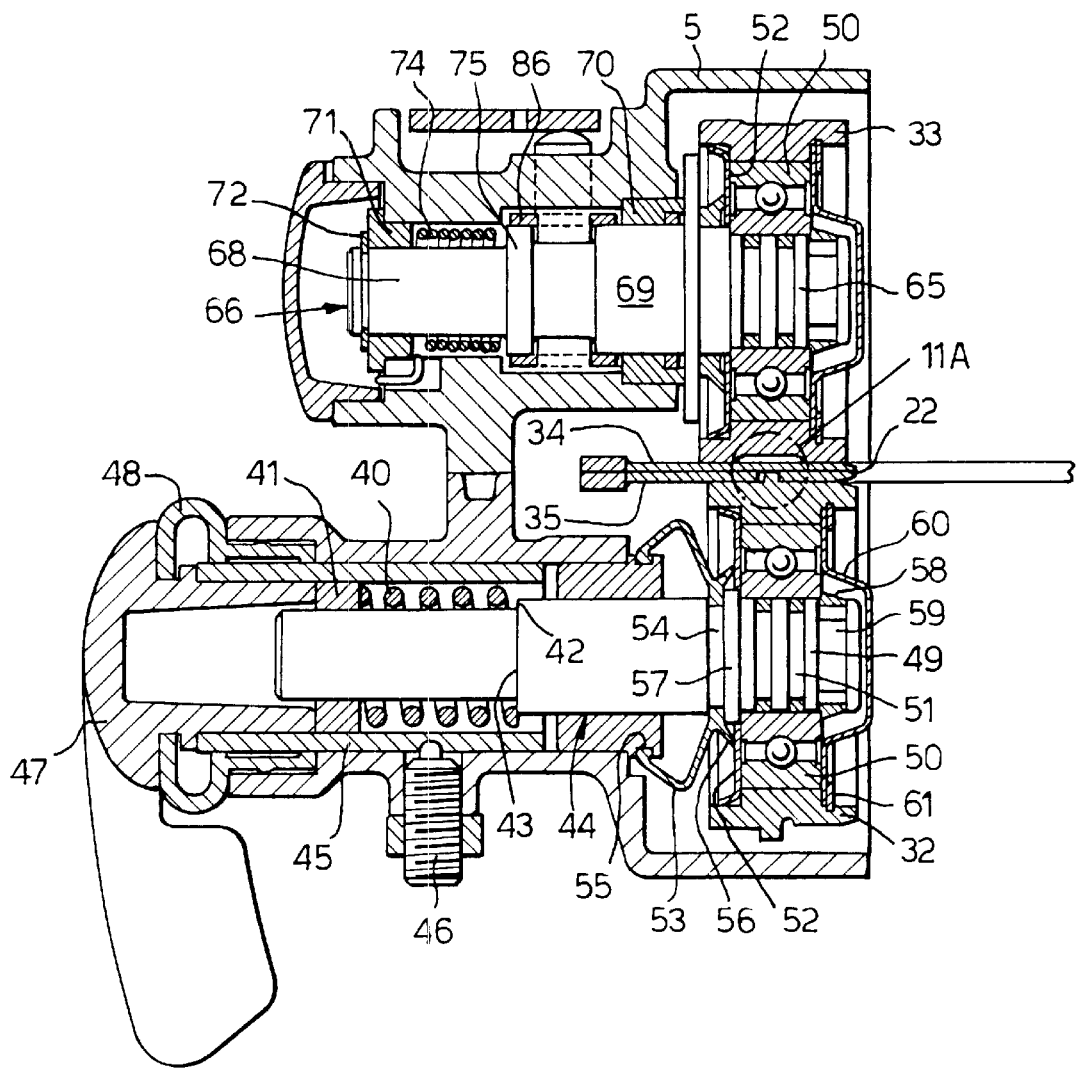
FIG. 11 shows the device according to the invention, in a cross-section along a line XI—XI in FIG. 10, with an encircled detail in enlarged scale, FIG. 11A.
Figure 11A:
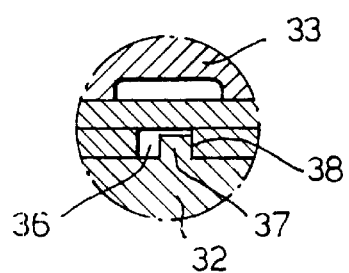

With reference first to FIGS. 1–9, a hydraulically driven cutting machine is denoted 1 and an annular shaped saw blade, driven by a hydraulic motor 2, is denoted 3. The main parts of the cutting machine 1 are a chassis 4 of casted light metal (aluminium alloy of the type Alumin), a support roller cover 5 of the same material and a rear manoeuvring and handle part 6, in the following called a manoeuvring arm. The manoeuvring arm 6 is manufactured from reinforced plastics and does in its turn consist of a left and a right moiety 7 and 8, respectively, FIG. 5, which are joined to a unit by screws. The chassis 4 is joined with the manoeuvring arm 6 by screws 9 and the support roller cover 5 is joined with the chassis 4 by a pair of screws 10, FIG. 2, FIG. 10.

The hydraulic motor 2 is mounted on the chassis 4 and is of the type described in U.S. Pat. No. 5,381,723. A pair of conduits for hydraulic oil has been denoted 12, 13 and a conduit for cooling water has been denoted 14. The cooling water is led to the saw blade 2 via a water disc 15, which may be of a known design, for example according to U.S. Pat. No. 5,038,474. In the manoeuvring arm 6 there is a control 17 for the hydraulic oil, a starter lock 18 and a control 19 for cooling water, everything in connection with a rear handle 20, together with not shown mechanisms and valves.

Between the chassis 4 and the support roller cover 5, there is a drive wheel 21, which is rotated by the hydraulic motor 2. The inner edge 22 of the saw blade 3 is wedge-shaped and is introduced into a wedge-shaped groove 23 in the drive wheel in a manner known per se.

A handle bow 25, which forms the front handle of the machine, is rotatably connected to the chassis 4 in a rotational hinge 26. The handle bow 25 is adjustable in our fixed positions, which are determined by four cylindrical depressions 27a–27d in the support roller cover 5, which depressions can receive a spring plunger on the handle bow 25. A blade cover has been denoted 28. This can be turned upwards-rearwards in a hinge 29 from the position which is shown in FIGS. 2–4, to a rear position when the handle bow 25 has been brought to its rear position, when the not shown plunger rests in the rear hole 27d. A splash guard has been denoted 30. In addition, there is a circular depression 24e in the manoeuvring arm 6. This depression 24e can also accommodate said plunger in order to fix the handle bow when it has been brought even further rearwards in order to make it possible to demount the support roller cover 5, e.g. for changing blade.

The device to hold and guide the saw blade 3 comprises— in addition to said drive wheel 21—a pair of guide rollers 32 in the chassis 4 and a pair of support rollers 33 in the support roller cover 5. The support rollers 33 contact the web of the saw blade 3 on the right hand side 34 of the blade, and the guide rollers 32 contact the web on the opposite, other, i.e. the left hand side 35 of the blade. An encircling guiding groove 36 is provided in the left hand side 35. An encircling flange 37 runs in the guiding groove 36 and is pressed against the inner edge 38 of the guiding groove 36 in order to, in its turn, press the saw blade with its wedge-shaped, inner edge part 22 into the wedge-shaped groove 23 in the drive wheel 21.

The principle for how the flange 37 of the guide wheel is pressed against the edge 38 of the wedge-shaped wheel is basically the same as is described in said U.S. Pat. No. 4,793,065, but the pressing mechanism has, from a functional point of view, been completely separated from the journalling, mounting and replaceability of the guide rollers 32. The various details included in the tightening-up unit will therefore only be briefly mentioned here and reference is, for the rest, made to said U.S. Pat. No. 4,793,065. For each guide roller 32 there is, for the tightening-up, a pressure spring 40 which operates between a bushing 41 and a flange 42 on an axially displaceable, but not rotatable shaft 43. A bearing housing for the shaft 43 has been denoted 44. The bushing 41 is arranged in a housing 45 in the chassis 4. The housing 45 is fixed with a stop screw 46. A knob 47 is, via a threaded coupling with a large pitch in its internal part, connected with the inside of the housing 45. By turning the knob 47 a portion of a revolution, e.g. 180°, the bushing 41 can thereby be pressed inwards to tighten the pressure spring 40 when the blade is to be mounted. The knob 47 is turned the other way to release. A bellows 48 of rubber acts as a sealing.

The guide roller 32 is pressed on a ball bearing 50, which in its turn is pressed on the outer end—the journal 49—of the shaft 43. The journal 49 has annular-shaped grooves, in which vibration damping O-rings 51 are arranged. On the back side of the guide roller 32, there is a rear seal washer 52. At the interior thereof, there is a rubber bellows 53, which with a flange-shaped portion is pressed into a groove 54 in the shaft 43 and with an inner flange part is fixed in a groove 55 in the bearing housing 44. Finally, the bellows 53 bears with a lip 56 sealingly against the rear seal washer 52. The ball bearing 50 is clamped between a flange 57 on the shaft 43 and a spring ring 58 which is snapped into a groove 59 in the shaft journal 49. The ball bearing 50 and the shaft journal 49 are covered by an outer sealing cover 60—like a hub cap—which is held in place by a spring ring 61 snapped into a groove in the guide roller 32.

Opposite each guide roller 32, there is a support roller 33. Each support roller 33 is pressed with a certain force against the web of the saw blade 3 under counter-pressure by the guide roller 32 which is arranged on the other side. How the desired pressing force can be achieved will now be explained more in detail.

Each support roller 33 is journalled on a journal 65 via a ball bearing 50. (Details with identical corresponding journalling and mounting details in the above described guide roller 32 have been given the same reference numerals as is used above and will not be described any further here.) The journal 65 is a crank journal, in the following called eccentric journal, on an eccentric shaft 66. The eccentric journal 65 is connected to the eccentric shaft 66 via a collar 67, FIG. 12. The eccentric shaft 66 is with its shaft portions 68 and 69 journalled in a rear and a front journal housing 70 and 71, respectively, in the support roller cover 5. A groove ring 72 bears against the back side of the rear journal housing 70. A torsion spring 74 is arranged around the eccentric shaft 66 between the rear journal housing 70 and a flange 75 on the eccentric shaft. The flange 75 has equally large outer diameter as the front shaft part 69 on the eccentric shaft 66. Both ends 76 and 77 of the torsion spring 74 are fixed in a groove in the support roller cover and in a groove 78 in the flange 75, respectively.

The torsion spring 74 is designed to be so strong that it, while overcoming friction forces between the eccentric shaft 66 and the journal housings 70, 71, can turn the eccentric shaft 66 around its axis of rotation 79, FIG. 12, when the eccentric shaft is not locked, as will be described in the following. Thus, the eccentric journal 65 will make an arc-shaped movement according to classical mechanics, when the eccentric shaft 66 is turned around the axis of rotation 79. By choice of the torsion spring 74 it operates in such a direction that the support roller 33 on the eccentric journal 65, which support roller is rotatable about the axis of rotation 80 of the eccentric journal, is pressed against the web of the saw blade 3 with a force which is determined by the spring force. The length of the rotating movement, when the support roller 33 and the ball bearing 50 have been demounted from the eccentric journal 65, is limited by a pin 81 which is attached to the support roller cover 5, FIGS. 8 and 9, and which is engaged in a groove 82 in the periphery of the collar 67, FIG. 12. Between the collar 67 and the rear seal washer 52 there is a seal ring.

In order to make the described unit for pressing each support roller 33 with desired force against the saw blade, work in the desired way, the eccentric shaft 66 and thus the support roller 33 must be able to be locked in their position, when the support roller has been pressed by the torsion spring 74 against the saw blade, or more correctly, the support roller 33 must be able to be locked, rotatably on the eccentric journal 65, with the desired force against the saw blade. Therefore, there is a locking device consisting of a brake lining 86. This consists of a pair of narrow straps 87, 88, which in their ends are connected to each other by a pair of connection pieces 89, 90. Approximately at the middle of the brake lining there is a wider connecting part 91. The brake lining 86 is mounted on the eccentric shaft 66 with the narrow straps 87, 88 bearing against the shaft part 69 and the flange part 75, respectively. A fixed screw 92, FIG. 13, presses against one cross-connection piece 89 between the straps 87, 88 at the edge and from the opposite side there is a piston 93 acting against the other cross-connection piece 90 between the straps 87, 88 at the edge. The piston 93 can be displaced in a through boring 94 in the support roller cover 5. The piston 93 extends a distance on the upper side of the support roller cover. A tongue 95 on a spring plate 96, FIG. 10, presses against the piston 93. By tightening the screw 10, which is done when the support roller cover 5 is to be screwed to the chassis 4, which is normally done after an exchange of saw blade 3 and/or drive wheel 21 or, more seldom, guide rollers 32 and/or support rollers 33, the tongue 95 will press the piston 93 into the hole 94 against the cross-connection 90 in the brake lining 86. As a result thereof, the brake lining is tightened around the eccentric shaft 66, whereby the desired locking of the eccentric journal 65 is achieved.

The locking of the eccentric shaft 66 and thereby of the eccentric journal 65 is in reality not momentarily. This is an advantage, since the torsion spring 74 is somewhat over-dimensioned in relation to the desired force that the support roller effects on the saw blade, which is motivated in that the torsion spring 74 has to be able to overcome said friction forces in order to be able, at all, to turn the eccentric shaft and thereby the eccentric journal, in order to press the support roller 33 against the saw blade. In the last stage of the tightening of the brake lining 86, the brake lining though, by its friction against the eccentric shaft, turns the eccentric shaft 66 back a bit against the direction of force of the torsion spring 74. By this, the pressing force of the corresponding support roller 33 against the saw blade 3 is somewhat relieved to achieve a desired, not too big pressing force.

Although, it should be clear from the above description in what way the saw blade is rotatably clamped in the machine, and how the saw blade and other wearing details, such as the drive wheel 21 but also the guide rollers 32 and the support rollers 33 can be exchanged, this will be described here. For the exchange of any of these details, both of the knobs 47 are first turned back to release position, to relieve the spring 40.

Hereby, the saw blade 3 is relieved from clamping forces in radial direction. The support roller cover 5 is thereafter removed by loosening the screws 10. The pistons 93 are thereby freed and thereby the corresponding brake linings 86, the grasp of which around the eccentric shaft 66 loosens, so that the corresponding eccentric shafts can be turned around their axis of rotation 79 as much as is permitted by the pin 81 and the groove 82 in the collar 67. When the support roller cover 5 has been removed in this way, the saw blade 3 can also be removed. The drive wheel 21 too can now be removed and be replaced by a new one. Further, the guide rollers 32 and support rollers 33 can be removed, which is easily done by loosening the corresponding spring ring 61 and outer sealing cover 60, whereafter the guide roller 32, or the support roller 33, can be removed from the corresponding ball bearing 50. As an alternative, also the ball bearing, possibly together with the corresponding roller, can be pulled to loosen from the outer journal 49 on the shaft 43 and from the eccentric journal 65, respectively, after the spring ring 58 has been removed. At the mounting of the different details, action is taken in the opposite way, so that the axial clamping with suitable pressing force from the support rollers 33 is automatically achieved in the last stage by the torsion spring 74 in combination with the brake lining 86, when the screws 10 are tightened.

Figure 14:
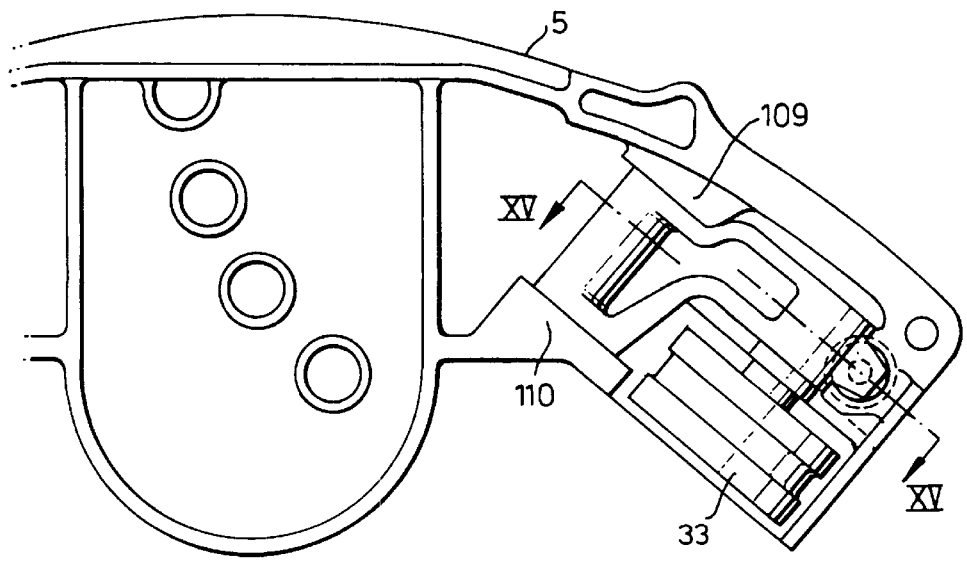
FIG. 14 shows a second embodiment of the device according to the invention.
Figure 15:
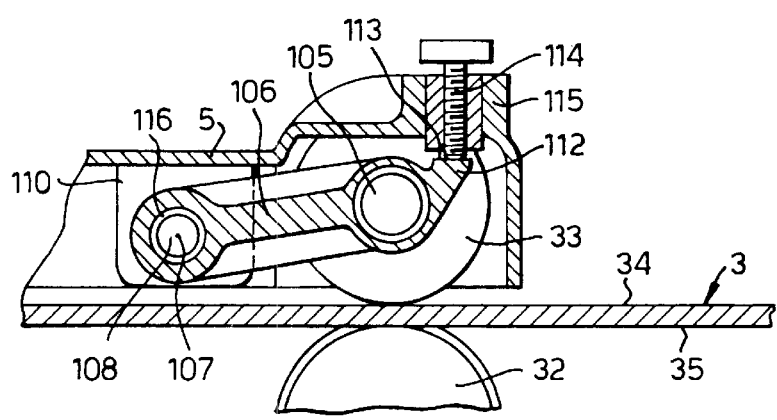
FIG. 15 is a view along the line XV—XV in FIG. 14 showing also a portion of the saw blade as well as a portion of a second roller on the opposite side of the blade.

In the embodiment according to FIGS. 14 and 15, the same designations have been used for details corresponding to the previous embodiment. The two support rollers 33 (only one is shown in the drawings) in the housing 5 are journalled through ball bearings on a shaft journal 105, which is mounted on a lever arm 106. This arm is rotatable around a centre of rotation 107, which is parallel to and arranged at a distance from the centre line of the shaft journal 105, which at the same is the centre of rotation for a first support roller 33. Said centre of rotation 107 is the centre line for a pivot including a pivot journal 108, which is rotatably mounted in a sliding bearing 116 extending between the bearing attachments 109, 110 in the support roller cover 5.

On the opposite side of said first shaft 105 in relation to said centre of rotation 107 there is a projection 112 forming a second lever arm. The projection 112 has a flat surface 113 facing upwards against the ceiling of the support roller cover 5. There is an adjustment screw 1 14 above the projection 112/end face 113, which screw is rotatably fixed in a screw housing 115 in the support roller cover 5.

By turning the adjustment screw 114, the screw can be pressed against the projection 112, so that the lever arm 106 is turned around its centre of rotation 107, wherein the shaft 105 is moved downwards and hence the support roller 33 is brought to contact, possibly press, against the web of the saw blade 3 under counter force from the guide roller 32 on the opposite side. The support roller not shown in the drawing is operated in the same way and is equipped as described above. Thus, the clamping of the saw blade 3 between the rollers 33 and 32 can by means of the respective screw 114 be adjusted for pressing said first rollers 33 with suitable force against the web of the blade 3 under counter force from the second rollers 32 on the opposite side of the blade. It should also be appreciated, that if the clamping force should be too strong, the pressing force can be adjusting by the screw 114 being unscrewed until the pressing or clamping is suitable.

What is claimed is:

1. A cutting machine with an annular saw blade and with driving means for off-center drive of the blade, comprising a clamping assembly to clamp the blade in the cutting machine, the clamping assembly comprising a plurality of first rollers (33) arranged to contact and to roll against a web of the blade on one side of the blade and a pluality of second rollers (32) arranged to contact and to roll against the web of the blade on the other, opposite side of the blade, characterized by a plurality of first shafts, wherein each of said first rollers is mounted on a first shaft, which is movable towards the blade, for pressing said first rollers with a certain desired force against the blade web under counter force by the second rollers (32) on the opposite side of the blade and characterized in that said first shaft (65), moves along a circular arc upon turning of an eccentric shaft (66), spring means (74) being arranged to turn the eccentric shaft and fixing means being arranged to lock the eccentric shaft when it has been turned to press the roller which is journalled on the first shaft, by the force of said spring means, against the web of the blade.

2. Device according to claim 1, characterised in that said fixing means comprise a brake lining arranged to lock the eccentric shaft when it is tightened.

3. Device according to claim 1, characterized in that a brake lining (86), when it is tightened, is arranged to turn back the eccentric shaft against the direction of force of said spring means, to thereby relieve, but not to neutralize the pressing force of said first rollers against the saw blade.

4. A cutting machine with an annular saw blade (3) and with driving means (2, 21) for off-center drive of a blade, comprising a plurality of first rollers (33) arranged to contact and to roll against a web of the blade on one side of the blade and a plurality of second rollers (32) arranged to contact and roll against the web of the blade on the other, opposite side of the blade, characterized by a plurality of first shafts (65, 105) wherein each of said first rollers is mounted on a first shaft (65, 105), which is movable along a path generally perpendicular to the blade where the first rollers contact the blade, for pressing said first rollers with a force against the blade web under counter force by the second rollers (32) on the opposite side of the blade characterized in that said first shaft (105) is journalled on a lever arm (106) rotatable around an axis of rotation (107) parallel to, and at a distance from, an axis of the first shaft, which is also the center of rotation of the respective first roller (33), and pressing means (114) for turning the lever arm about its axis of rotation (107), and in that said pressing means is an adjustment screw (114) associated with the first plurality of rollers and the lever arm.

* * * * *